US008957885B2

(12) United States Patent
Lee

(10) Patent No.: US 8,957,885 B2
(45) Date of Patent: Feb. 17, 2015

(54) METHOD OF DRIVING DISPLAY PANEL AND DISPLAY APPARATUS FOR PERFORMING THE SAME

(75) Inventor: Sang-Hun Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 301 days.

(21) Appl. No.: 13/371,860

(22) Filed: Feb. 13, 2012

(65) Prior Publication Data

US 2012/0293476 A1 Nov. 22, 2012

(30) Foreign Application Priority Data

May 18, 2011 (KR) ........................ 10-2011-0046858

(51) Int. Cl.
*G06F 3/038* (2013.01)
*G09G 3/36* (2006.01)

(52) U.S. Cl.
CPC ............ *G09G 3/3614* (2013.01); *G09G 3/3685* (2013.01); *G09G 2320/02* (2013.01)
USPC .......................................................... 345/209

(58) Field of Classification Search
CPC ........................... G09G 3/3614; G09G 3/3685
USPC ...................... 345/204, 208, 209, 87, 89, 690
See application file for complete search history.

(56) References Cited

U.S. PATENT DOCUMENTS

| | | | | |
|---|---|---|---|---|
| 6,870,524 | B2 | 3/2005 | Katsutani | |
| 2004/0189575 | A1* | 9/2004 | Choi et al. | 345/96 |
| 2005/0104834 | A1* | 5/2005 | Tsuchihashi | 345/96 |
| 2006/0017680 | A1* | 1/2006 | Chen et al. | 345/96 |
| 2006/0279506 | A1 | 12/2006 | Choi | |
| 2008/0001889 | A1* | 1/2008 | Chun et al. | 345/96 |
| 2008/0088615 | A1* | 4/2008 | Chen et al. | 345/209 |
| 2008/0158131 | A1* | 7/2008 | Park et al. | 345/98 |
| 2010/0164925 | A1* | 7/2010 | Weng | 345/211 |

FOREIGN PATENT DOCUMENTS

| | | | |
|---|---|---|---|
| JP | 3019635 | B2 | 1/2000 |
| KR | 1020070094374 | A | 9/2007 |

* cited by examiner

*Primary Examiner* — Pegeman Karimi
(74) *Attorney, Agent, or Firm* — Cantor Colburn LLP

(57) ABSTRACT

A method of driving a display panel includes outputting a gate signal to a gate line of the display panel, outputting a data voltage having an offset value of a first polarity to a first pixel during a P-th frame, and outputting a data voltage having an offset value of a second polarity opposite to the first polarity to a second pixel during the P-th frame, where P is a natural number, the first pixel and the second pixel are connected to a same data line of the display panel, and the offset value of the first polarity and the offset value of the second polarity compensate for each other.

19 Claims, 7 Drawing Sheets

METHOD OF DRIVING DISPLAY PANEL AND DISPLAY APPARATUS FOR PERFORMING THE SAME

This application claims priority to Korean Patent Application No. 2011-0046858, filed on May 18, 2011, and all the benefits accruing therefrom under 35 U.S.C. §119, the content of which in its entirety is herein incorporated by reference.

BACKGROUND OF THE INVENTION

1. Field of the Invention

Exemplary embodiments of the invention relate to a method of driving a display panel and a display apparatus for performing the method. More particularly, exemplary embodiments of the invention relate to a method of driving a display panel with improved display quality and a display apparatus for performing the method.

2. Description of the Related Art

Generally, a liquid crystal display ("LCD") apparatus includes a display panel that displays an image and a panel driver that drives the display panel. The display panel includes a plurality of gate lines, a plurality of data lines and a plurality of pixels connected to the gate lines and the data lines.

The panel driver includes a gate driver and a data driver. The gate driver generates a gate signal, and outputs the gate signal to the gate lines. The data driver generates a data voltage, and outputs the data voltage to the data lines.

The data driver may include an operational amplifier ("OP amp"). In an ideal OP amp, an output voltage is zero (0) volt ("V") when an input voltage is zero (0) V. However, in a practical OP amp, an offset voltage is outputted even though an input voltage is zero (0) V.

The offset voltage may have a positive value or a negative value with respect to the output voltage. When the offset voltage is not compensated, data voltages outputted to pixels are varied in pixel columns such that a vertical line defect may occur, and display quality of a display panel may be deteriorated.

BRIEF SUMMARY OF THE INVENTION

Exemplary embodiments of the invention provide a method of driving a display panel with improved display quality by compensating offset values of data voltage.

Exemplary embodiments of the invention also provide a display apparatus for performing the above-mentioned method.

In an example method of driving a display panel according to the invention, the method includes outputting a gate signal to a gate line of the display panel, outputting a data voltage having an offset value of a first polarity to a first pixel during a P-th frame, and outputting a data voltage having an offset value of a second polarity opposite to the first polarity to a second pixel during the P-th frame, where P is a natural number, the first pixel and the second pixel are connected to a same data line of the display panel, and the offset value of the first polarity and the offset value of the second polarity compensate for each other.

In an exemplary embodiment, the method may further include outputting a data voltage having an offset value of the second polarity to the first pixel during a Q-th frame to compensate for the offset value of the first polarity, where Q is a natural number.

In an exemplary embodiment, Q may be equal to P+2.

In an exemplary embodiment, the display panel may include a first pixel column and a second pixel column, and a first data line of the display panel may be sequentially connected to a first pixel of the first pixel column, a first pixel of the second pixel column, a second pixel of the first pixel column, a second pixel of the second pixel column, a third pixel of the first pixel column, a third pixel of the second pixel column, a fourth pixel of the first pixel column and a fourth pixel of the second pixel column.

In an exemplary embodiment, a data voltage outputted to the first data line may sequentially have a first offset value, a second offset value, a third offset value, a fourth offset value, the second offset value, the first offset value, the fourth offset value and the third offset value during the P-th frame, the first offset value may have a polarity opposite to a polarity of the second offset value and an absolute value substantially equal to the absolute value of the second offset value, and the third offset value may have a polarity opposite to a polarity of the fourth offset value and an absolute value substantially equal to the absolute value of the fourth offset value.

In an exemplary embodiment, the data voltage outputted to the first data line may sequentially have the second offset value, the first offset value, the fourth offset value, the third offset value, the first offset value, the second offset value, the third offset value and the fourth offset value during the Q-th frame.

In an exemplary embodiment, a data voltage outputted to a second data line adjacent to the first data line may sequentially have the third offset value, the fourth offset value, the first offset value, the second offset value, the fourth offset value, the third offset value, the second offset value and the first offset value during the P-th frame.

In an exemplary embodiment, the data voltage outputted to the first data line may sequentially have the first polarity, the first polarity, the second polarity, the second polarity, the first polarity, the first polarity, the second polarity and the second polarity with respect to a common voltage during the P-th frame.

In an exemplary embodiment, the data voltage outputted to a second data line adjacent to the first data line may sequentially have the second polarity, the second polarity, the first polarity, the first polarity, the second polarity, the second polarity, the first polarity and the first polarity with respect to the common voltage during the P-th frame.

In an exemplary embodiment, the data voltage outputted to the first data line may be inverted every frame.

In an example display apparatus according to the invention, the display apparatus includes a display panel including a plurality of gate lines and a plurality of data lines, a gate driver connected to the plurality of gate lines, wherein the gate driver outputs a gate signal to the plurality of gate lines and a data driver which outputs a data voltage having an offset value of a first polarity to a first pixel, and outputs a data voltage having an offset value of a second polarity opposite to the first polarity to a second pixel, wherein the first pixel and the second pixel are connected to a same data line of the plurality of data lines.

In an exemplary embodiment, the display panel may include a first pixel column and a second pixel column, and a first data line of the plurality of data lines may be sequentially connected to a first pixel of the first pixel column, a first pixel of the second pixel column, a second pixel of the first pixel column, a second pixel of the second pixel column, a third pixel of the first pixel column, a third pixel of the second pixel column, a fourth pixel of the first pixel column and a fourth pixel of the second pixel column.

In an exemplary embodiment, the data driver may include an output buffer connected to the first data line and a second data line of the plurality of data lines, adjacent to the first data line, and the output buffer may include a first operational amplifier, a second operational amplifier and a multiplexer connected to the first operational amplifier and the second operational amplifier.

In an exemplary embodiment, the first operational amplifier may have a first offset value and a second offset value, and the first offset value may have a polarity opposite to a polarity of the second offset value and an absolute value substantially equal to the absolute value of the second offset value. In such an embodiment, the second operational amplifier may have a third offset value and a fourth offset value, and the third offset value may have a polarity opposite to a polarity of the fourth offset value and an absolute value substantially equal to the absolute value of the fourth offset value.

In an exemplary embodiment, the data voltage outputted to the first data line may sequentially have the first offset value, the second offset value, the third offset value, the fourth offset value, the second offset value, the first offset value, the fourth offset value and the third offset value during a P-th frame, where P is a natural number.

In an exemplary embodiment, the data voltage outputted to the first data line may sequentially have the second offset value, the first offset value, the fourth offset value, the third offset value, the first offset value, the second offset value, the third offset value and the fourth offset value during a Q-th frame, where Q is a natural number.

In an exemplary embodiment, Q may be equal to P+2.

In an exemplary embodiment, the data voltage outputted to the first data line may sequentially have the first polarity, the first polarity, the second polarity, the second polarity, the first polarity, the first polarity, the second polarity and the second polarity with respect to a common voltage during the P-th frame.

In an exemplary embodiment, the data voltage outputted to the first data line may be inverted every frame.

According to a method of driving a display panel and a display apparatus for performing the method, an offset value of a data voltage is spatially and temporally compensated such that display quality of the display panel is substantially improved.

BRIEF DESCRIPTION OF THE DRAWINGS

The above and other features and aspects of the invention will become more apparent by describing in detailed exemplary embodiments thereof with reference to the accompanying drawings, in which.

DETAILED DESCRIPTION OF THE INVENTION

Figure 1:
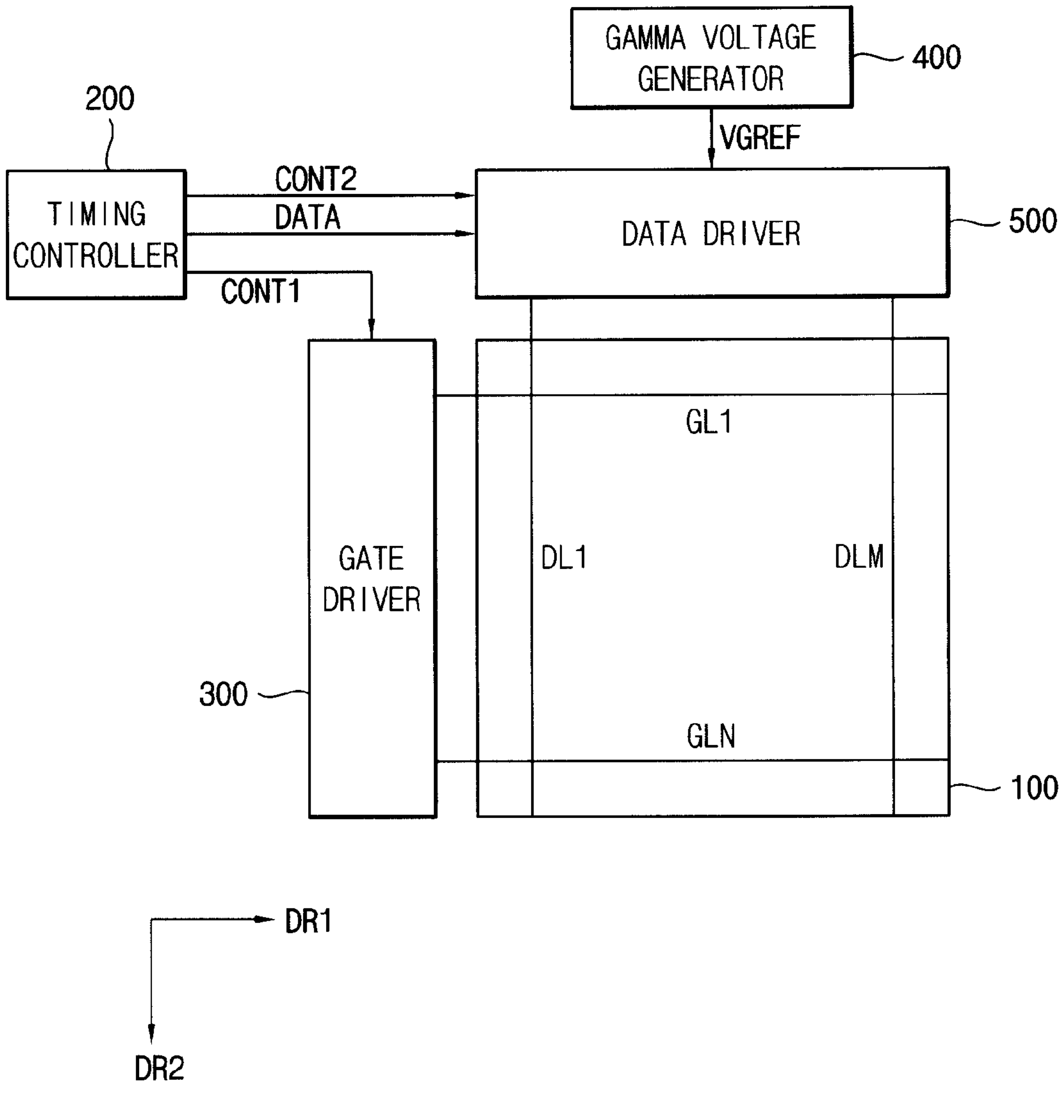
FIG. 1 is a block diagram illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

FIG. 1 is a block diagram illustrating an exemplary embodiment of a display apparatus according to the invention.

Referring to FIG. 1, the display apparatus includes a display panel 100, a timing controller 200, a gate driver 300, a gamma voltage generator 400 and a data driver 500.

The display panel 100 includes a plurality of gate lines GL1 to GLN, a plurality of data lines DL1 to DLM, and a plurality of pixels electrically connected to the gate lines GL1 to GLN and the data lines DL1 to DLM. Here, N and M are natural numbers.

The gate lines GL1 to GLN extend in a first direction DR1, and the data lines DL1 to DLM extend in a second direction DR2 crossing the first direction DR1. In an exemplary embodiment, the first direction and the second direction may be substantially perpendicular to each other.

Each pixel includes a switching element (not shown), a liquid crystal capacitor (not shown) and a storage capacitor (not shown). The liquid crystal capacitor and the storage capacitor are electrically connected to the switching element. The pixels may be arranged substantially in a matrix form. The arrangement of the pixels will be explained referring to FIG. 2 in detail.

The timing controller 200 receives an input image data and an input control signal from an external apparatus (not shown). The input image data may include a red image data, a green image data and a blue image data. The input control signal may include a master clock signal, a data enable signal, a vertical synchronization signal and a horizontal synchronization signal.

The timing controller 200 generates a first control signal CONT1, a second control signal CONT2 and a data signal DATA based on the input image data and the input control signal. The timing controller 200 generates the first control signal CONT1 for controlling a driving timing of the gate driver 300 based on the input control signal, and outputs the first control signal CONT1 to the gate driver 300. The timing controller 200 generates the second control signal CONT2 for controlling a driving timing of the data driver 500 based on the input control signal, and outputs the second control signal CONT2 to the data driver 500.

The first control signal CONT1 includes a vertical start signal and a gate clock signal. The second control signal CONT2 includes a horizontal start signal and a load signal. The second control signal CONT2 may further include a polarity inverting signal.

The gate driver 300 generates gate signals, which are transmitted to the gate lines GL1 to GLN, in response to the first control signal CONT1 received from the timing controller 200. The gate driver 300 sequentially outputs the gate signals to the gate lines GL1 to GLN.

In an exemplary embodiment, the gate driver 300 may be disposed, e.g., directly mounted, on the display panel 100, or may be connected to the display panel 100 as a tape carrier package ("TCP") type. In an alternative exemplary embodiment, the gate driver 300 may be integrated on the display panel 100.

The gamma voltage generator 400 generates a gamma reference voltage VGREF. The gamma voltage generator 400 provides the gamma reference voltage VGREF to the data driver 500. The gamma reference voltage VGREF has a value corresponding to a level of the data signal DATA. The gamma voltage generator 400 may be disposed in the timing controller 200, or in the data driver 500.

The data driver 500 receives the second control signal CONT2 and the data signal DATA from the timing controller 200, and receives the gamma reference voltages VGREF from the gamma voltage generator 400. The data driver 500 converts the data signal DATA into data voltages of an analogue type using the gamma reference voltages VGREF. The data driver 500 sequentially outputs the data voltages to the data lines DL1 to DLM.

In an exemplary embodiment, the data driver 500 may be disposed, e.g., directly mounted, on the display panel 100, or be connected to the display panel 100 in a TCP type. In an alternative exemplary embodiment, the data driver 500 may be integrated on the display panel 100. The data driver 500 will be described later in greater detail referring to FIG. 3.

Figure 2:
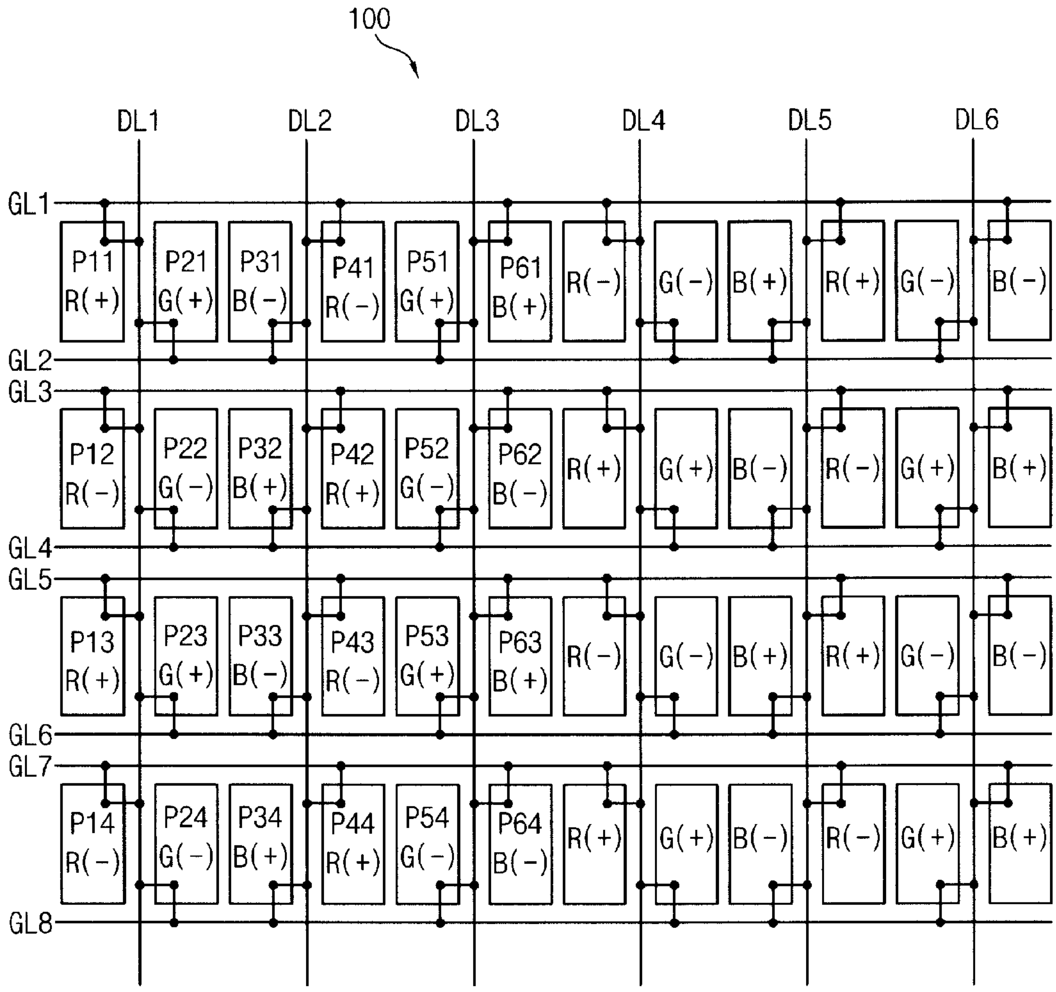
FIG. 2 is a block diagram illustrating an arrangement of pixels of the display panel of FIG. 1.

FIG. 2 is a block diagram illustrating an arrangement of the pixels of the display panel 100 of FIG. 1.

Referring to FIG. 2, the display panel 100 includes the gate lines, e.g., a first gate line GL1 to an eighth gate line GL8, the data lines, e.g., a first data line DL1 to a sixth data line DL6, and the pixels disposed in an area defined by the gate lines GL1 to GL8 and the data lines DL1 to DL6 crossing each other.

The pixels are disposed in a plurality of pixel columns. A first pixel column includes a first pixel P11, a second pixel P12, a third pixel P13 and a fourth pixel P14. The pixels P11 to P14 in the first pixel column may be red pixels R. A second pixel column, which is adjacent to the first pixel column, includes a first pixel P21, a second pixel P22, a third pixel P23 and a fourth pixel P24. The pixels P21 to P24 in the second pixel column may be green pixels G. A third pixel column, which is adjacent to the second pixel column, includes a first pixel P31, a second pixel P32, a third pixel P33 and a fourth pixel P34. The pixels P31 to P34 in the third pixel column may be blue pixels B. A fourth pixel column, which is adjacent to the third pixel column, includes a first pixel P41, a second pixel P42, a third pixel P43 and a fourth pixel P44. The pixels P41 to P44 in the fourth pixel column may be red pixels R. A fifth pixel column, which is adjacent to the fourth pixel column, includes a first pixel P51, a second pixel P52, a third pixel P53 and a fourth pixel P54. The pixels P51 to P54 in the fifth pixel column may be green pixels G. A sixth pixel column, which is adjacent to the fifth pixel column, includes a first pixel P61, a second pixel P62, a third pixel P63 and a fourth pixel P64. The pixels P61 to P664 in the sixth pixel column may be blue pixels B.

The pixels in two adjacent pixel columns are connected to a same data line. In one exemplary embodiment, for example, the pixels P11 to P14 in the first pixel column and the pixels P21 to P24 in the second pixel column are connected to the first data line DL1. In such an embodiment, the pixels P31 to P34 in the third pixel column and the pixels P41 to P44 in the fourth pixel column are connected to the second data line DL2, and the pixels P51 to P54 in the fifth pixel column and the pixels P61 to P64 in the sixth pixel column are connected to the third data line DL3.

In an exemplary embodiment, as shown in FIG. 2, the first data line DL1 is alternately connected to the first pixel P11 of the first pixel column, the first pixel P21 of the second pixel column, the second pixel P12 of the first pixel column, the second pixel P22 of the second pixel column, the third pixel P13 of the first pixel column, the third pixel P23 of the second pixel column, the fourth pixel P14 of the first pixel column and the fourth pixel P24 of the second pixel column. In an alternative exemplary embodiment, the first data line DL1 may be connected to pixels of the second pixel column prior to corresponding pixels of the first pixel column, respectively.

The second data line DL2 is alternately connected to the first pixel P41 of the fourth pixel column, the first pixel P31 of the third pixel column, the second pixel P42 of the fourth pixel column, the second pixel P32 of the third pixel column, the third pixel P43 of the fourth pixel column, the third pixel P33 of the third pixel column, the fourth pixel P44 of the fourth pixel column and the fourth pixel P34 of the third pixel column. In an alternative exemplary embodiment, the second data line DL2 may be connected to pixels of the third pixel column prior to corresponding pixels of the fourth pixel column, respectively.

The third data line DL3 is alternately connected to the first pixel P61 of the sixth pixel column, the first pixel P51 of the fifth pixel column, the second pixel P62 of the sixth pixel column, the second pixel P52 of the fifth pixel column, the third pixel P63 of the sixth pixel column, the third pixel P53 of the fifth pixel column, the fourth pixel P64 of the sixth pixel column and the fourth pixel P54 of the fifth pixel column. In an alternative exemplary embodiment, the third data line DL3 may be connected to pixels of the fifth pixel column prior to corresponding pixels of the sixth pixel column, respectively.

The pixels in a single pixel row are alternately connected to two adjacent gate lines. The pixels P11, P21, P31, P41, P51 and P61 in a first pixel row are connected one of the first and second gate lines GL1 and GL2. In one exemplary embodiment, for example, the first gate line GL1 may be connected to the first pixel P11 of the first pixel column, the first pixel P41 of the fourth pixel column and the first pixel P61 of the sixth pixel column, and the second gate line GL2 may be connected to the first pixel P21 of the second pixel column, the first pixel P31 of the third pixel column and the first pixel P51 of the fifth pixel column.

In an exemplary embodiment, the pixels P12, P22, P32, P42, P52 and P62 in a second pixel row are connected one of the third and fourth gate lines GL3 and GL4. The pixels P13, P23, P33, P43, P53 and P63 in a third pixel row are connected one of the fifth and sixth gate lines GL5 and GL6. The pixels P14, P24, P34, P44, P54 and P64 in a fourth pixel row are connected one of the seventh and eighth gate lines GL7 and GL8.

Data voltages applied to the data lines may have a first polarity and a second polarity opposite to the first polarity. The polarities of the data voltage may be inverted every two pixels. In one exemplary embodiment, for example, a first data voltage applied to the first data line DL1 may sequentially have a positive polarity (+), a positive polarity (+), a negative polarity (−), a negative polarity (−), a positive polarity (+), a positive polarity (+), a negative polarity (−) and a negative polarity (−). Here, the positive polarity (+) is defined as a voltage higher than a common voltage, and the negative polarity (−) is defined as a voltage lower than the common voltage.

The data voltages applied to two adjacent data lines have polarities opposite to each other. In one exemplary embodiment, for example, a second data voltage applied to the second data line DL2 adjacent to the first data line DL1 may sequentially have a negative polarity (−), a negative polarity (−), a positive polarity (+), a positive polarity (+), a negative polarity (−), a negative polarity (−), a positive polarity (+) and a positive polarity (+).

In such an embodiment, the data voltages applied to the pixels in the display panel 100 are inverted every two pixels in the first direction DR1, and inverted every pixel in the second direction DR2.

Although not shown in FIG. 2, the data voltages applied to the pixels may be inverted on a frame-by-frame basis.

Although an arrangement of 4×12 pixels are illustrated in FIG. 2, the invention is not limited thereto. In an exemplary embodiment, the display panel 100 may include more pixels than illustrated pixels in FIG. 2.

Figure 3:
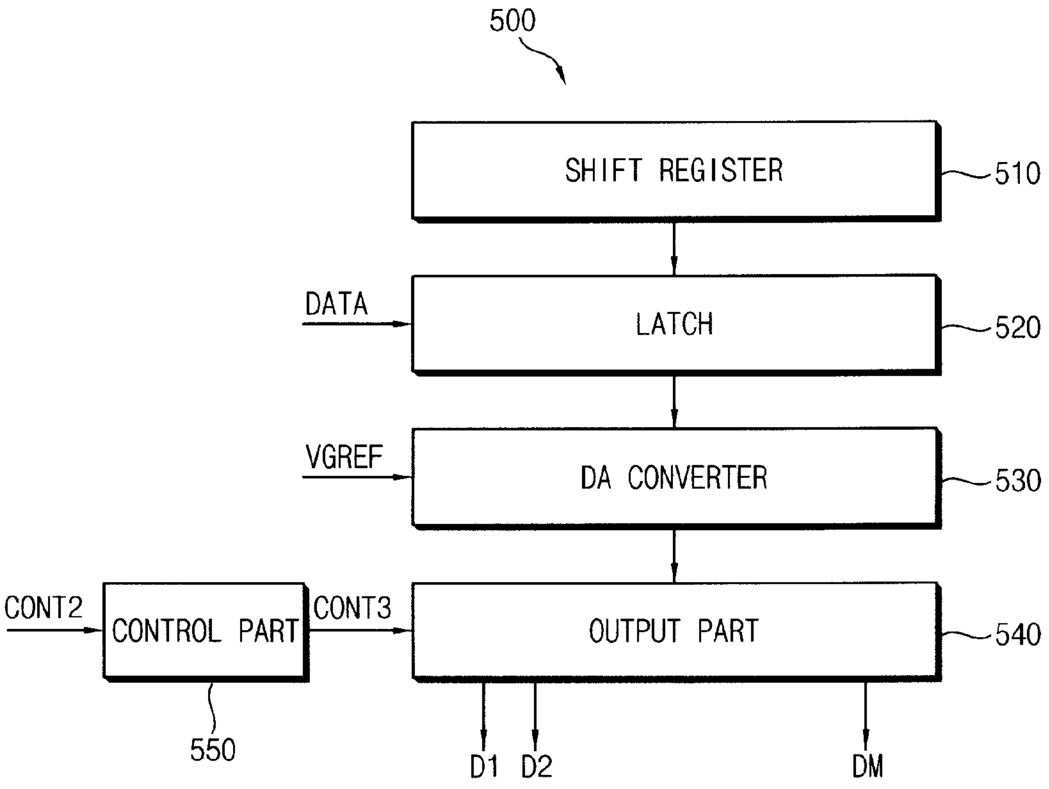
FIG. 3 is a block diagram illustrating an exemplary embodiment of a data driver of FIG. 1.

FIG. 3 is a block diagram illustrating an exemplary embodiment of the data driver 500 of FIG. 1.

The data driver 500 includes a shift register 510, a latch 520, a digital to analog converter ("DA converter") 530, an output part 540 and a control part 550.

The shift register 510 outputs a latch pulse to the latch 520.

The latch 520 receives the data signal DATA from the timing controller 200. The latch 520 temporarily stores the data signal DATA, and outputs the data signal DATA to the DA converter 530.

The DA converter 530 receives the data signal DATA from the latch 520, and receives the gamma reference voltage VGREF from the gamma voltage generator 400. The DA converter 530 generates the data voltages of an analogue type, e.g., a first data voltage D1 to an M-th data voltage DM, based on the data signal DATA of a digital type and the gamma reference voltages VGREF. The DA converter 530 outputs the data voltages D1 to DM to the output part 540.

The output part 540 receives the data voltages D1 to DM from the DA converter 530, and receives a third control signal CONT3 from the control part 550.

The output part 540 compensates the data voltages D1 to DM to have a uniform level, and outputs the data voltages D1 to DM to the data lines DL1 to DLM. The output part 540 will be described later in greater detail referring to FIG. 4.

The control part 550 controls an operation of the output part 540. The control part 550 receives a control signal from outside. The control part 550 may receive the second control signal CONT2 from the timing controller 200.

The control part 550 outputs the third control signal CONT3 for controlling the operation of the output part 540 to the output part 540. The control part 550 may adjust polarities of the data voltages D1 to DM outputted from the output part 540 using the third control signal CONT3. The control part 550 may adjust offset values of the data voltages D1 to DM outputted from the output part 540 using the third control signal CONT3. The third control signal may include the polarity inverting signal and the load signal.

Although the data driver 500 includes the control part 550 in the illustrated exemplary embodiment, the invention is not limited thereto. In an alternative exemplary embodiment, the timing controller 200 may include the control part 550.

Figure 4:
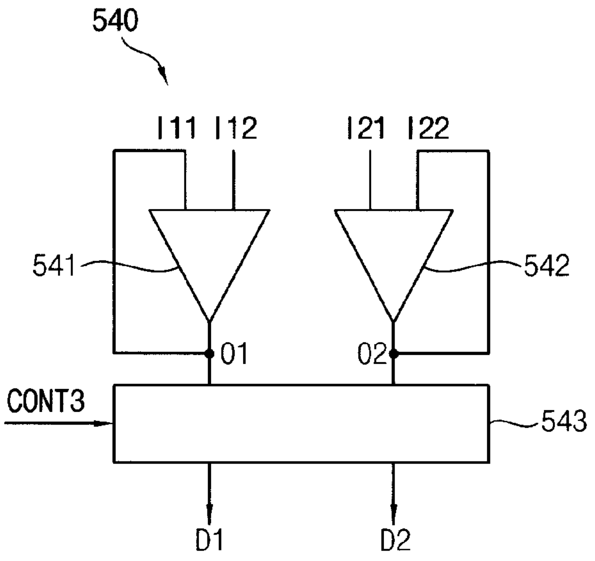
FIG. 4 is a schematic circuit diagram illustrating an exemplary embodiment of an output part of FIG. 3.

FIG. 4 is a schematic circuit diagram illustrating the output part 540 of FIG. 3.

Referring to FIGS. 3 and 4, the output part 540 may include a plurality of output buffers. In one exemplary embodiment, for example, each of the output buffers may be connected to two adjacent data lines.

Each of the output buffers includes a first operational amplifier ("OP amp") 541, a second OP amp 542 and a multiplexer 543.

A first input terminal I11 of the first OP amp 541 is connected to an output terminal O1 of the first OP amp 541. A data voltage is applied to a second input terminal I12 of the first OP amp 541. The output terminal O1 of the first OP amp 541 is connected to a first input terminal of the multiplexer 543.

A data voltage is applied to a first input terminal I21 of the second OP amp 542. A second input terminal I22 of the second OP amp is connected to an output terminal O2 of the second OP amp 542. The output terminal O2 of the second OP amp 542 is connected to a second input terminal of the multiplexer 543.

The first OP amp 541 may output a data voltage having a constant polarity, e.g., the first polarity. The second OP amp 542 may output a data voltage having a constant polarity, e.g., the second polarity.

The first OP amp 541 may have a first offset value a and a second offset value b. The first offset value a may have a polarity opposite to a polarity of the second offset value b. The first offset value a may have an absolute value substantially equal to an absolute value of the second offset value b. Thus, the first and second offset values a and b may satisfy the following equation: $a=-b$.

The second OP amp 542 may have a third offset value x and a fourth offset value y. The third offset value x may have a polarity opposite to a polarity of the fourth offset value y. The third offset value x may have an absolute value substantially equal to an absolute value of the fourth offset value y. Thus, the third and fourth offset values x and y may satisfy the following equation: $x=-y$.

The first offset value a of the first OP amp 541 and the third offset value x of the second OP amp 542 are independent of each other. In one exemplary embodiment, for example, the first offset value a may have an absolute value different from the absolute value of the third offset value x. The first offset value a may have a polarity the same as the polarity of the third offset value x or may have a polarity different from the polarity of the third offset value x.

In one exemplary embodiment, for example, the absolute values of the first to fourth offset values a, b, x and y may be equal to or less than about 20 millivolts (mV).

The multiplexer 543 of the output part 540 receives the third control signal CONT3 from the control part 550, and receives output values of the first and second OP amps 541 and 542.

The multiplexer 543 selects one of the output values of the first OP amp 541 and the output value of the second OP amp 542 based on the third control signal CONT3 to generate a first data voltage D1. The multiplexer 543 selects one of the output values of the first OP amp 541 and the output value of the second OP amp 542 based on the third control signal CONT3 to generate a second data voltage D2.

In one exemplary embodiment, for example, the multiplexer 543 generates the first data voltage D1 having a first polarity and a second data voltage D2 having a second polarity opposite to the first polarity based on the polarity inverting signal.

The multiplexer 543 outputs the first data voltage D1 to the first data line DL1. The multiplexer 543 outputs the second data voltage D2 to the second data line DL2.

Figure 5A:
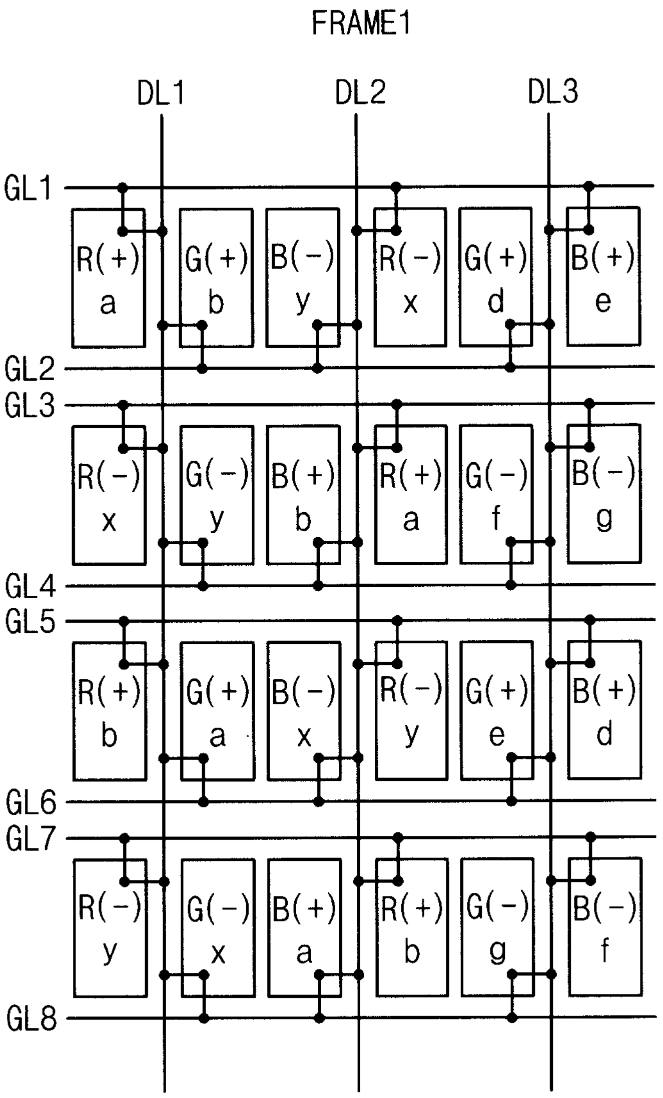
FIG. 5A is a block diagram illustrating a polarity and an offset value of a data voltage applied to the display panel of FIG. 1 during a first frame.
Figure 5B:
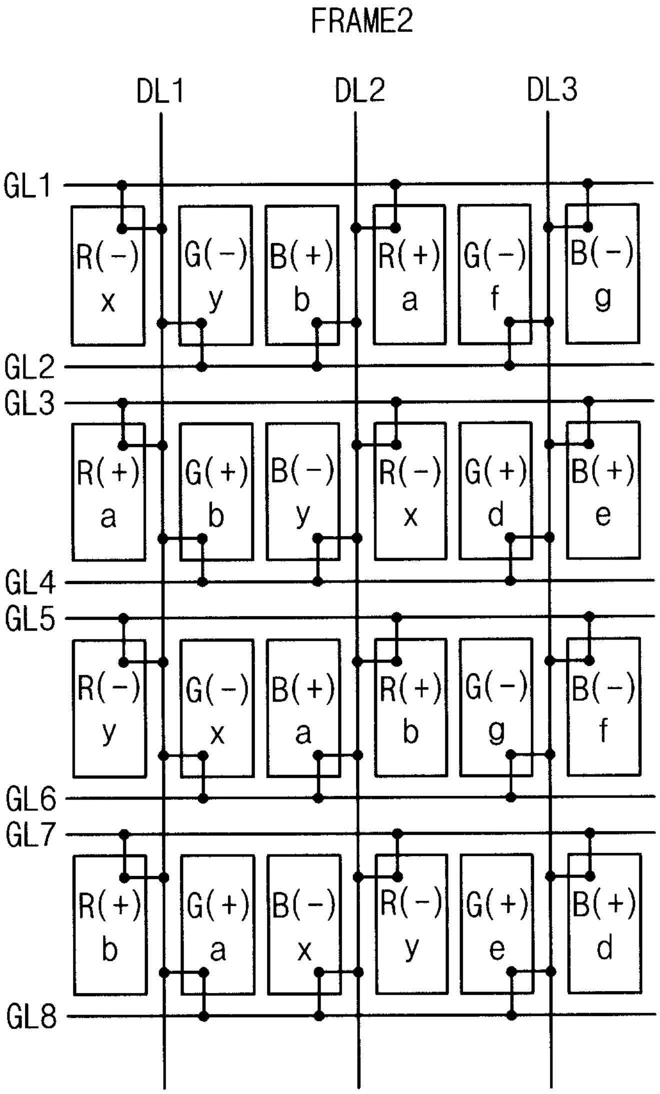
FIG. 5B is a block diagram illustrating a polarity and an offset value of a data voltage applied to the display panel of FIG. 1 during a second frame.
Figure 5C:
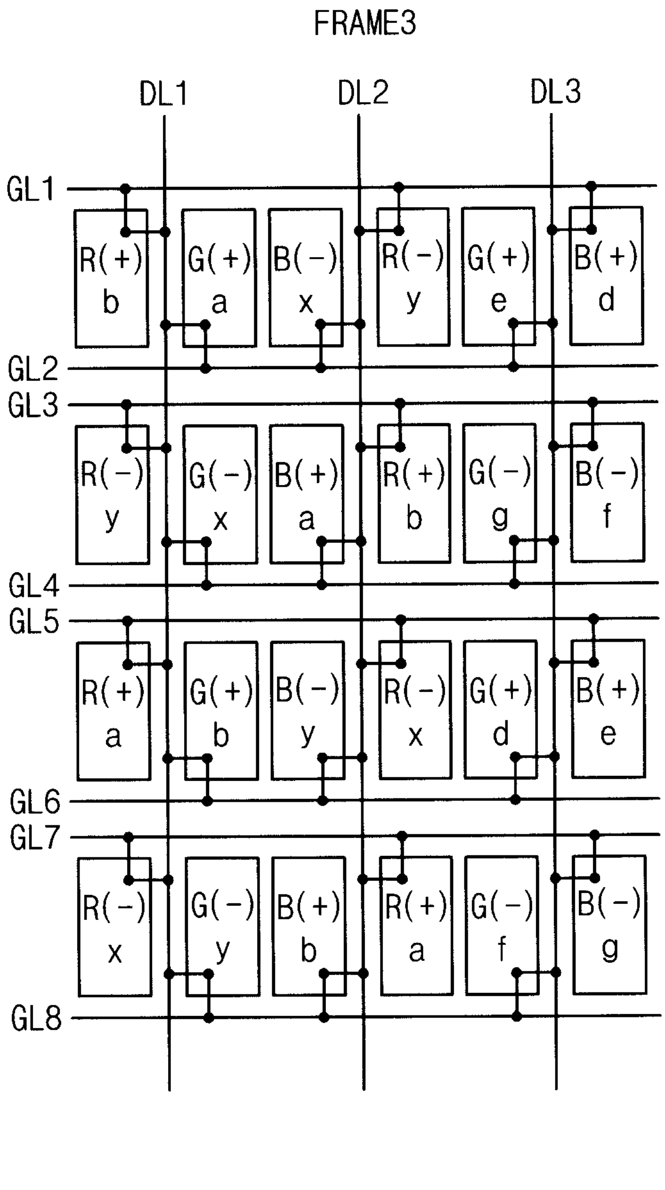
FIG. 5C is a block diagram illustrating a polarity and an offset value of a data voltage applied to the display panel of FIG. 1 during a third frame.
Figure 5D:
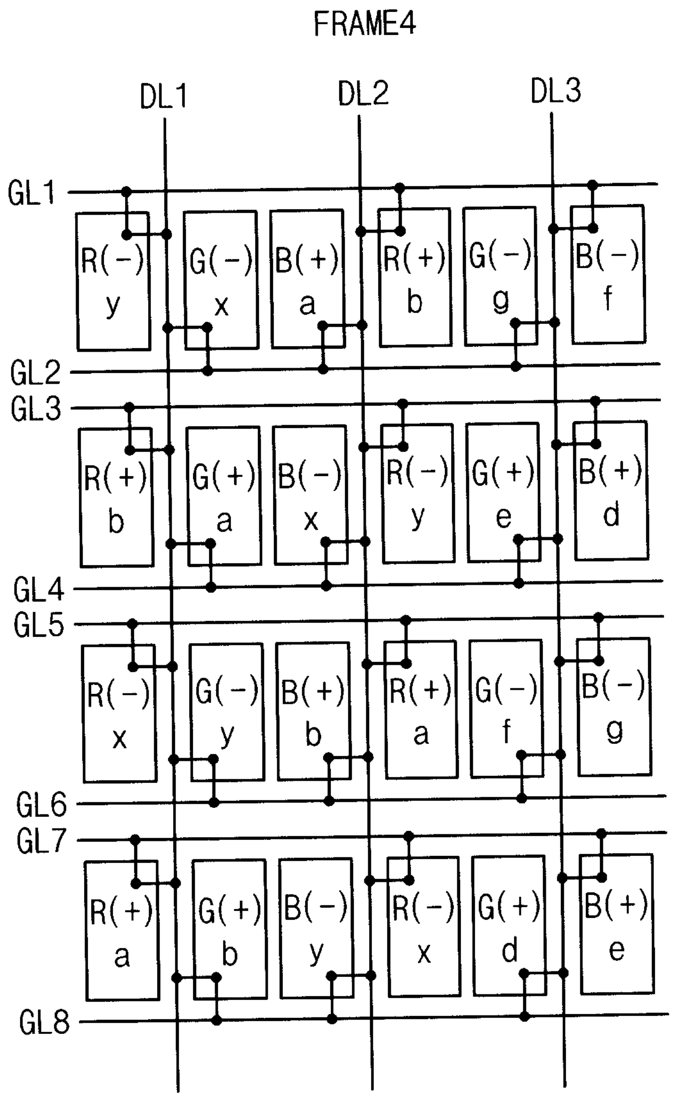
FIG. 5D is a block diagram illustrating a polarity and an offset value of a data voltage applied to the display panel of FIG. 1 during a fourth frame.

FIG. 5A is a block diagram illustrating a polarity and an offset value of a data voltage applied to the display panel 100 of FIG. 1 during a first frame FRAME1. FIG. 5B is a block diagram illustrating a polarity and an offset value of a data voltage applied to the display panel 100 of FIG. 1 during a second frame FRAME2. FIG. 5C is a block diagram illustrating a polarity and an offset value of a data voltage applied to the display panel 100 of FIG. 1 during a third frame FRAME3. FIG. 5D is a block diagram illustrating a polarity and an offset value of a data voltage applied to the display panel 100 of FIG. 1 during a fourth frame FRAME4.

Referring to FIGS. 2, 4 and 5A, the first data line DL1 and the second data line DL2 are connected to the multiplexer 543 of a first output buffer. The third data line DL3 and a fourth data line (not shown) may be connected to a multiplexer of a second output buffer.

The first OP amp 541 of the first output buffer connected to the first and second data lines DL1 and DL2 has the first offset value a and the second offset value b. The second OP amp 542 of the first output buffer has the third offset value x and the fourth offset value y.

A first OP amp of the second output buffer connected to the third and fourth data lines DL3 and DL4 has a fifth offset value d and a sixth offset value e. A second OP amp of the second output buffer has a seventh offset value f and an eighth offset value g.

During the first frame FRAME1, a first data voltage D1 outputted to the first data line DL1 sequentially has the first offset value a, the second offset value b, the third offset value x, the fourth offset value y, the second offset value b, the first offset value a, the fourth offset value y and the third offset value x.

In such an embodiment, during the first frame FRAME1, the first data voltage D1 outputted to the first data line DL1 sequentially has a positive polarity (+), a positive polarity (+), a negative polarity (−), a negative polarity (−), a positive polarity (+), a positive polarity (+), a negative polarity (−) and a negative polarity (−).

In such an embodiment, a data voltage applied to the first pixel P11 of the first pixel column has the positive polarity (+) and the first offset value a during the first frame FRAME1. A data voltage applied to the first pixel P21 of the second pixel column has the positive polarity (+) and the second offset value b during the first frame FRAME1. A data voltage applied to the second pixel P12 of the first pixel column has the negative polarity (−) and the third offset value x during the first frame FRAME1. A data voltage applied to the second pixel P22 of the second pixel column has the negative polarity (−) and the fourth offset value y during the first frame FRAME1. A data voltage applied to the third pixel P13 of the first pixel column has the positive polarity (+) and the second offset value b during the first frame FRAME1. A data voltage applied to the third pixel P23 of the second pixel column has the positive polarity (+) and the first offset value a during the first frame FRAME1. A data voltage applied to the fourth pixel P14 of the first pixel column has the negative polarity (−) and the fourth offset value y during the first frame FRAME1. A data voltage applied to the fourth pixel P24 of the second pixel column has the negative polarity (−) and the third offset value x during the first frame FRAME1.

In such an embodiment, the data voltage applied to the first pixel P11 of the first pixel column has the positive polarity (+) and the first offset value a, the data voltage applied to the third pixel P13 of the first pixel column has the positive polarity (+) and the second offset value b. The first offset value a has the polarity opposite to the polarity of the second offset value b, and has the absolute value substantially equal to the absolute value of the second offset value b (e.g., a=−b). In such an embodiment, a spatial gap between the first pixel P11 and the third pixel P13 of the first pixel column is substantially small such that an observer may not recognize a difference of locations between the first and third pixels P11 and P13 of the first pixel column through eyes. Thus, the first offset value a and b of the data voltages applied to the first and third pixels P11 and P13 of the first pixel column may be spatially compensated by each other.

In one exemplary embodiment, for example, the common voltage may be about 5 volt (V), the data voltage having the positive polarity may be about 10 V, and the data voltage having the negative polarity may be about zero (0) V. The first offset value a may be about 10 mV. The second offset value b may be about −10 mV. The third offset value x may be about 15 mV. The fourth offset value y may be about −15 mV.

In such an embodiment, the data voltage applied to the first pixel P11 of the first pixel column is about 10.01 V, the data voltage applied to the first pixel P21 of the second pixel column is about 9.99 V, the data voltage applied to the second pixel P12 of the first pixel column is about 0.015 V, and the data voltage applied to the second pixel P22 of the second pixel column is about −0.015 V. The data voltage applied to the third pixel P13 of the first pixel column is about 9.99 V, the data voltage applied to the third pixel P23 of the second pixel column is about 10.01 V, the data voltage applied to the fourth pixel P14 of the first pixel column is about −0.015 V, and the data voltage applied to the fourth pixel P24 of the second pixel column is about 0.015 V.

The data voltage applied to the first pixel P11 of the first pixel column of about 10.01 V is compensated by the data voltage applied to the third pixel P13 of the first pixel column of about 9.99 V such that the data voltages of the first pixel P11 and the third pixel P13 of the first pixel column may be shown as about 10.00 V to the observer.

Similarly, the offset values a and b of the data voltages applied to the first and third pixels P21 and P23 of the second pixel column may be compensated by each other.

The third offset value x has the polarity opposite to the polarity of the fourth offset value y, and has the absolute value substantially equal to the absolute value of the fourth offset value y (e.g., x=−y) such that the offset values x and y of the data voltages applied to the second and fourth pixels P12 and P14 of the first pixel column may be spatially compensated by each other.

Similarly, the offset values x and y of the data voltages applied to the second and fourth pixels P22 and P24 of the second pixel column may be compensated by each other.

During the first frame FRAME1, a second data voltage D2 outputted to the second data line DL2 sequentially has the third offset value x, the fourth offset value y, the first offset value a, the second offset value b, the fourth offset value y, the third offset value x, the second offset value b and the first offset value a.

In such an embodiment, during the first frame FRAME1, the second data voltage D2 outputted to the second data line DL2 sequentially has a negative polarity (−), a negative polarity (−), a positive polarity (+), a positive polarity (+), a negative polarity (−), a negative polarity (−), a positive polarity (+) and a positive polarity (+).

The first offset value a has the polarity opposite to the polarity of the second offset value b, and has the absolute value substantially equal to the absolute value of the second offset value b (e.g., a=−b) such that the offset values a and b of the data voltages applied to the second and fourth pixels P32 and P34 of the third pixel column may be spatially compensated by each other.

Similarly, the offset values a and b of the data voltages applied to the second and fourth pixels P42 and P44 of the fourth pixel column may be compensated by each other.

The third offset value x has the polarity opposite to the polarity of the fourth offset value y, and has the absolute value substantially equal to the absolute value of the fourth offset value b (e.g., x=−y) such that the offset values x and y of the data voltages applied to the first and third pixels P31 and P33 of the third pixel column may spatially compensate for each other.

Similarly, the offset values x and y of the data voltages applied to the first and third pixels P41 and P43 of the fourth pixel column may compensate for each other.

In such an embodiment, a K-th pixel and a (K+2)-th pixel in the same pixel column have offset values having opposite polarities and a same absolute value such that the offset values of the data voltages applied to the K-th and (K+2)-th pixels in the same pixel column may spatially compensate for each other. Here, K is a natural number.

In the illustrated exemplary embodiment, the offset value of the data voltage applied to the (K+2)-th pixel compensates for the offset value of the data voltage applied to the K-th pixel, but the invention is not limited thereto. In an alternative exemplary embodiment, the above-described compensating method may be applied to pixels substantially close to each other not to be distinguishable through eyes of an observer, that is, the pixels in a same column have offset values having opposite polarities and a same absolute value are disposed substantially close to each other such that the offset values of the data voltages applied to the K-th and (K+2)-th pixels in the same pixel column may spatially compensate for each other.

Referring to FIGS. 5A and 5B, during the second frame FRAME2, the data voltages have polarities inverted with respect to the polarities in the first frame FRAME1.

During the second frame FRAME2, a first data voltage D1 outputted to the first data line DL1 sequentially has the third offset value x, the fourth offset value y, the first offset value a, the second offset value b, the fourth offset value y, the third offset value x, the second offset value b and the first offset value a.

In such an embodiment, during the second frame FRAME2, the first data voltage D1 outputted to the first data line DL1 sequentially has a negative polarity (−), a negative polarity (−), a positive polarity (+), a positive polarity (+), a negative polarity (−), a negative polarity (−), a positive polarity (+) and a positive polarity (+).

During the second frame FRAME2, a second data voltage D2 outputted to the second data line DL2 sequentially has the first offset value a, the second offset value b, the third offset value x, the fourth offset value y, the second offset value b, the first offset value a, the fourth offset value y and the third offset value x.

In such an embodiment, during the second frame FRAME2, the second data voltage D2 outputted to the second data line DL2 sequentially has a positive polarity (+), a positive polarity (+), a negative polarity (−), a negative polarity (−), a positive polarity (+), a positive polarity (+), a negative polarity (−) and a negative polarity (−).

In such an embodiment, the K-th pixel and the (K+2)-th pixel in a same pixel column have offset values having opposite polarities and a same absolute value such that the offset values of the data voltages applied to the K-th and (K+2)-th pixels in the same pixel column may spatially compensate for each other.

Referring to FIGS. 5A to 5C, during the third frame FRAME3, the data voltages have polarities inverted with respect to the polarities in the second frame FRAME2. Thus, the data voltages in the third frame FRAME3 have the polarities the same as the polarity of the data voltages in the first frame FRAME1.

During the third frame FRAME3, a first data voltage D1 outputted to the first data line DL1 sequentially has the second offset value b, the first offset value a, the fourth offset value y, the third offset value x, the first offset value a, the second offset value b, the third offset value x and the fourth offset value y.

In such an embodiment, the first data voltage D1 outputted to the first data line DL1 sequentially has a positive polarity (+), a positive polarity (+), a negative polarity (−), a negative polarity (−), a positive polarity (+), a positive polarity (+), a negative polarity (−) and a negative polarity (−).

In such an embodiment, a data voltage applied to the first pixel P11 of the first pixel column has the positive polarity (+) and the second offset value b during the third frame FRAME3. A data voltage applied to the first pixel P21 of the second pixel column has the positive polarity (+) and the first offset value a during the third frame FRAME3. A data voltage applied to the second pixel P12 of the first pixel column has the negative polarity (−) and the fourth offset value y during the third frame FRAME3. A data voltage applied to the second pixel P22 of the second pixel column has the negative polarity (−) and the third offset value x during the third frame FRAME3. A data voltage applied to the third pixel P13 of the first pixel column has the positive polarity (+) and the first offset value a during the third frame FRAME3. A data voltage applied to the third pixel P23 of the second pixel column has the positive polarity (+) and the second offset value b during the third frame FRAME3. A data voltage applied to the fourth pixel P14 of the first pixel column has the negative polarity (−) and the third offset value x during the third frame FRAME3. A data voltage applied to the fourth pixel P24 of the second pixel column has the negative polarity (−) and the fourth offset value y during the third frame FRAME3.

In such an embodiment, the K-th pixel and the (K+2)-th pixel in the same pixel column have offset values having opposite polarities and same absolute values such that the offset values of the data voltages applied to the K-th and (K+2)-th pixels in the same pixel column may spatially compensate for each other.

Referring to FIGS. 5A and 5C the data voltage applied to the first pixel P11 of the first pixel column during the first frame FRAME1 has the positive polarity (+) and the first offset value a, the data voltage applied to the first pixel P11 of the first pixel column during the third frame FRAME3 has the positive polarity (+) and the second offset value b. The first offset value a has the polarity opposite to the polarity of the second offset value b, and has the absolute value substantially equal to the absolute value of the second offset value b (e.g., a=−b). In such an embodiment, a temporal gap between the first frame FRAME1 and the third frame FRAME3 is substantially short such that an observer may not recognize a temporal difference between the first and third frames FRAME1 and FRAME3 through eyes. Thus, the first offset value a and b of the data voltages applied to the first pixel P11 of the first pixel column during the first and third frames FRAME1 and FRAME3 may temporally compensate for each other.

Similarly, the offset values a and b of the data voltages applied to the first pixel P21 of the second pixel column during the first and third frames FRAME1 and FRAME3 may compensate for each other.

The third offset value x has the polarity opposite to the polarity of the fourth offset value y, and has the absolute value substantially equal to the absolute value of the fourth offset value y (e.g., x=−y) such that the offset values x and y of the data voltages applied to the second pixel P12 of the first pixel column during the first and third frames FRAME1 and FRAME3 may temporally compensates for each other.

Similarly, the offset values x and y of the data voltages applied to the second pixel P22 of the second pixel column during the first and third frames FRAME1 and FRAME3 may compensate for each other.

Therefore, each pixel has offset values having opposite polarities and a same absolute value during a P-th frame and a (P+2)-th frame such that the offset values of the data voltages applied to each pixel may temporally compensate for each other. Here, P is a natural number.

In the illustrated exemplary embodiment, the offset value of the data voltage applied to the pixel during the (P+2)-th pixel compensates for the offset value of the data voltage applied to each pixel during the P-th frame, but the invention is not limited thereto. In an alternative exemplary embodiment, the above-described compensating method may be applied to frames having a gap substantially short not to be distinguishable through eyes of an observer, that is, the offset value of the data voltage applied to each pixel during the frames having the gap is temporally close to each other such that the offset values of the data voltages applied to each pixel during the frames having the gap may temporally compensate for each other.

Referring to FIGS. 5A to 5D, during the fourth frame FRAME4, the data voltages have polarities inverted with respect to the polarities the third frame FRAME3. Thus, the data voltages in the fourth frame FRAME4 have the polarities the same as the polarity of the data voltages in the second frame FRAME2.

During the fourth frame FRAME4, a first data voltage D1 outputted to the first data line DL1 sequentially has the fourth offset value y, the third offset value x, the second offset value b, the first offset value a, the third offset value x, the fourth offset value y, the first offset value a and the second offset value b.

In such an embodiment, during the fourth frame FRAME4, the first data voltage D1 outputted to the first data line DL1 sequentially has negative polarity (−), a negative polarity (−), a positive polarity (+), a positive polarity (+), a negative polarity (−), a negative polarity (−), a positive polarity (+) and a positive polarity (+).

In an exemplary embodiment, the K-th pixel and the (K+2)-th pixel in a same pixel column have offset values having opposite polarities and a same absolute value such that the offset values of the data voltages applied to the K-th and (K+2)-th pixels in the same pixel column may spatially compensate for each other.

Referring to FIGS. 5B and 5D, the data voltage applied to the first pixel P11 of the first pixel column during the second frame FRAME2 has the negative polarity (−) and the third offset value x, and the data voltage applied to the first pixel P11 of the first pixel column during the fourth frame FRAME4 has the negative polarity (−) and the fourth offset value y. The third offset value x has the polarity opposite to the fourth offset value y, and has the absolute value substantially equal to the absolute value of the fourth offset value y (x=−y). In such an embodiment, a temporal gap between the third frame FRAME3 and the fourth frame FRAME4 is substantially short such that an observer may not recognize a temporal difference between the second and fourth frames FRAME2 and FRAME4 through eyes. Thus, the first offset value x and y of the data voltages applied to the first pixel P11 of the first pixel column during the second and fourth frames FRAME2 and FRAME4 may temporally compensate for each other.

Similarly, the offset values x and y of the data voltages applied to the first pixel P21 of the second pixel column during the second and fourth frames FRAME2 and FRAME4 may compensate for each other.

The first offset value a has the polarity opposite to the polarity of the second offset value b, and has the absolute value substantially equal to the absolute value of the second offset value b (e.g., a=−b) such that the offset values a and b of the data voltages applied to the second pixel P12 of the first pixel column and the second pixel P22 of the second pixel column during the second and fourth frames FRAME2 and FRAME4 may temporally compensate for each other.

Therefore, each pixel has offset values having opposite polarities and a same absolute value during a P-th frame and a (P+2)-th frame such that the offset values of the data voltages applied to each pixel may temporally compensate for each other.

In exemplary embodiments according to the invention, offset values of a data voltage spatially and temporally compensates for each other such that display quality of the display panel is substantially improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of driving a display panel, the method comprising:

outputting a gate signal to a gate line of the display panel;

outputting a data voltage of a first polarity with respect to a common voltage having an offset value of the first polarity with respect to the data voltage to a first pixel of the display panel during a P-th frame; and outputting a data voltage of the first polarity with respect to a common voltage having an offset value of a second polarity with respect to the data voltage opposite to the first polarity to a second pixel of the display panel during the P-th frame, wherein P is a natural number, wherein the first pixel and the second pixel are connected to a same data line of the display panel, wherein the offset value of the first polarity and the offset value of the second polarity compensate for each other and have substantially the same absolute value, and wherein the data voltage having the offset value of the first polarity and the data voltage having the offset value of the second polarity have different absolute values.

2. The method of claim 1, further comprising:

outputting the data voltage having the offset value of the second polarity to the first pixel during a Q-th frame to compensate for the offset value of the first polarity during the P-th frame, wherein Q is a natural number.

3. The method of claim 2, wherein Q is equal to P+2.

4. The method of claim 1, wherein the display panel includes a first pixel column and a second pixel column, and a first data line of the display panel is sequentially connected to a first pixel of the first pixel column, a first pixel of the second pixel column, a second pixel of the first pixel column, a second pixel of the second pixel column, a third pixel of the first pixel column, a third pixel of the second pixel column, a fourth pixel of the first pixel column and a fourth pixel of the second pixel column.

5. The method of claim 4, wherein a data voltage outputted to the first data line sequentially has a first offset value, a second offset value, a third offset value, a fourth offset value, the second offset value, the first offset value, the fourth offset value and the third offset value during the P-th frame, the first offset value has a polarity opposite to a polarity of the second offset value and an absolute value substantially equal to an absolute value of the second offset value, and the third offset value has a polarity opposite to a polarity of the fourth offset value and an absolute value substantially equal to an absolute value of the fourth offset value.

6. The method of claim 5, wherein the data voltage outputted to the first data line sequentially has the second offset value, the first offset value, the fourth offset value, the third offset value, the first offset value, the second offset value, the third offset value and the fourth offset value during a Q-th frame, wherein Q is equal to P+2.

7. The method of claim 5, wherein a data voltage outputted to a second data line of the display panel, adjacent to the first data line, sequentially has the third offset value, the fourth offset value, the first offset value, the second offset value, the fourth offset value, the third offset value, the second offset value and the first offset value during the P-th frame.

8. The method of claim 5, wherein the data voltage outputted to the first data line sequentially has the first polarity, the first polarity, the second polarity, the second polarity, the first polarity, the first polarity, the second polarity and the second polarity with respect to the common voltage during the P-th frame.

9. The method of claim 8, wherein a data voltage outputted to a second data line of the display panel, adjacent to the first data line, sequentially has the second polarity, the second polarity, the first polarity, the first polarity, the second polarity, the second polarity, the first polarity and the first polarity with respect to the common voltage during the P-th frame.

10. The method of claim 8, wherein the data voltage outputted to the first data line is inverted every frame.

11. A display apparatus comprising:

a display panel including a plurality of gate lines and a plurality of data lines;

a gate driver connected to the plurality of gate lines, wherein the gate driver outputs a gate signal to the plurality of gate lines; and a data driver which outputs a data voltage of a first polarity with respect to a common voltage having an offset value of the first polarity with respect to the data voltage to a first pixel during a frame, and outputs a data voltage of the first polarity with respect to the common voltage having an offset value of a second polarity with respect to the data voltage opposite to the first polarity to a second pixel during the same frame, wherein the first pixel and the second pixel are connected to a same data line of the plurality of data lines, wherein the offset value of the first polarity and the offset value of the second polarity compensate for each other and have substantially the same absolute value, and wherein the data voltage having the offset value of the first polarity and the data voltage having the offset value of the second polarity have different absolute values.

12. The display apparatus of claim 11, wherein the display panel further includes a first pixel column and a second pixel column, and a first data line of the plurality of data lines is sequentially connected to a first pixel of the first pixel column, a first pixel of the second pixel column, a second pixel of the first pixel column, a second pixel of the second pixel column, a third pixel of the first pixel column, a third pixel of the second pixel column, a fourth pixel of the first pixel column and a fourth pixel of the second pixel column.

13. The display apparatus of claim 12, wherein the data driver comprises an output buffer connected to the first data line and a second data line of the plurality of data lines, adjacent to the first data line, and the output buffer comprises:

a first operational amplifier;

a second operational amplifier; and a multiplexer connected to the first operational amplifier and the second operational amplifier.

14. The display apparatus of claim 13, wherein the first operational amplifier has a first offset value and a second offset value, the first offset value has a polarity opposite to a polarity of the second offset value and an absolute value substantially equal to an absolute value of the second offset value, the second operational amplifier has a third offset value and a fourth offset value, and the third offset value has a polarity opposite to a polarity of the fourth offset value and an absolute value substantially equal to an absolute value of the fourth offset value.

15. The display apparatus of claim 14, wherein the data voltage outputted to the first data line sequentially has the first offset value, the second offset value, the third offset value, the fourth offset value, the second offset value, the first offset value, the fourth offset value and the third offset value during a P-th frame, and wherein P is a natural number.

16. The display apparatus of claim 15, wherein the data voltage outputted to the first data line sequentially has the second offset value, the first offset value, the fourth offset value, the third offset value, the first offset value, the second offset value, the third offset value and the fourth offset value during a Q-th frame, and wherein Q is a natural number.

17. The display apparatus of claim 16, wherein Q is equal to P+2.

18. The display apparatus of claim 15, wherein the data voltage outputted to the first data line sequentially has the first polarity, the first polarity, the second polarity, the second polarity, the first polarity, the first polarity, the second polarity and the second polarity with respect to the common voltage during the P-th frame.

19. The display apparatus of claim 18, wherein the data voltage outputted to the first data line is inverted every frame.

* * * * *